June 7, 1938.  W. B. STOUT  2,119,655
BUS BODY CONSTRUCTION
Filed Aug. 19, 1936   4 Sheets-Sheet 2
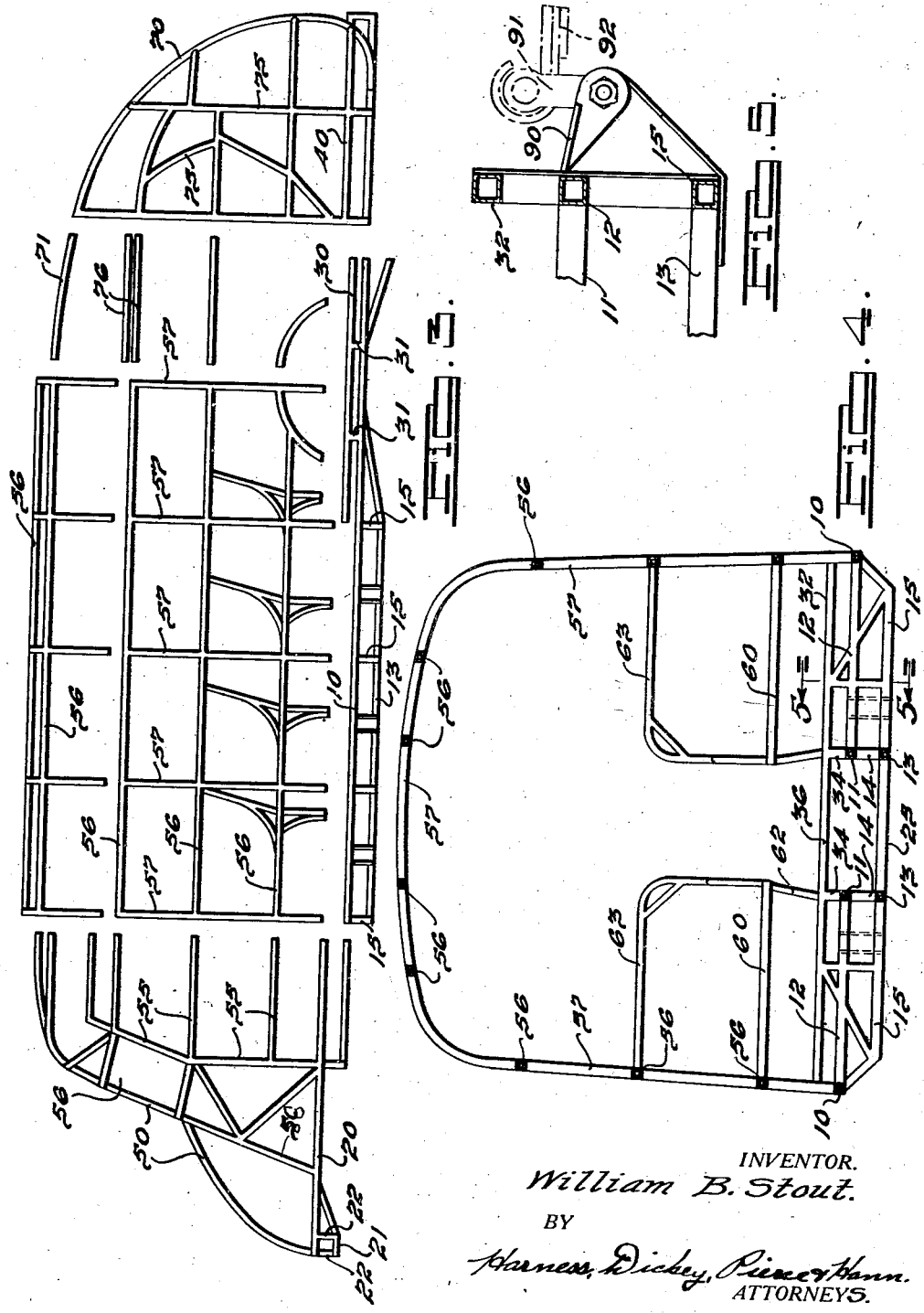
INVENTOR.
William B. Stout.
BY
Harness, Dickey, Pierce & Hann.
ATTORNEYS.

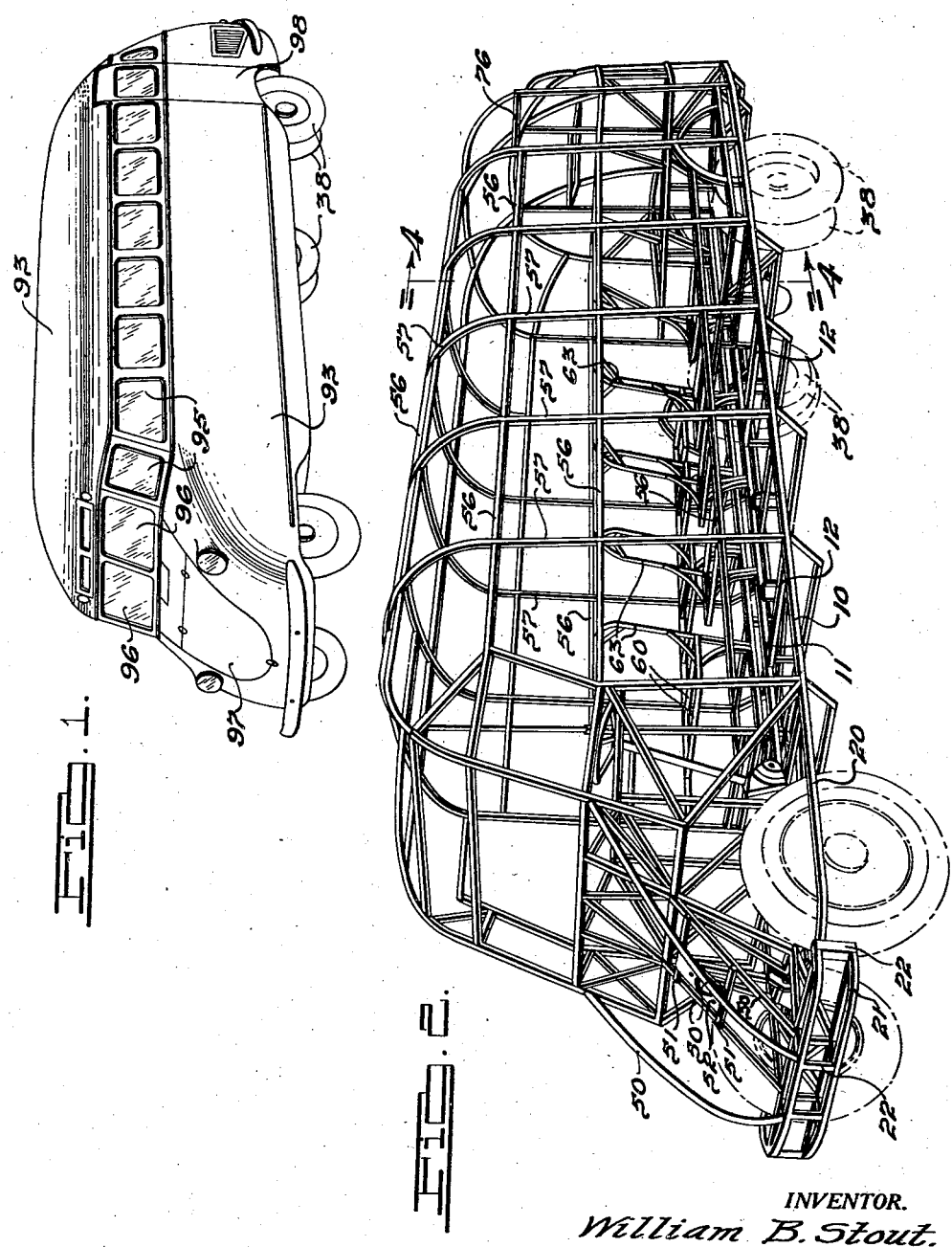

June 7, 1938.  W. B. STOUT  2,119,655
BUS BODY CONSTRUCTION
Filed Aug. 19, 1936    4 Sheets-Sheet 3
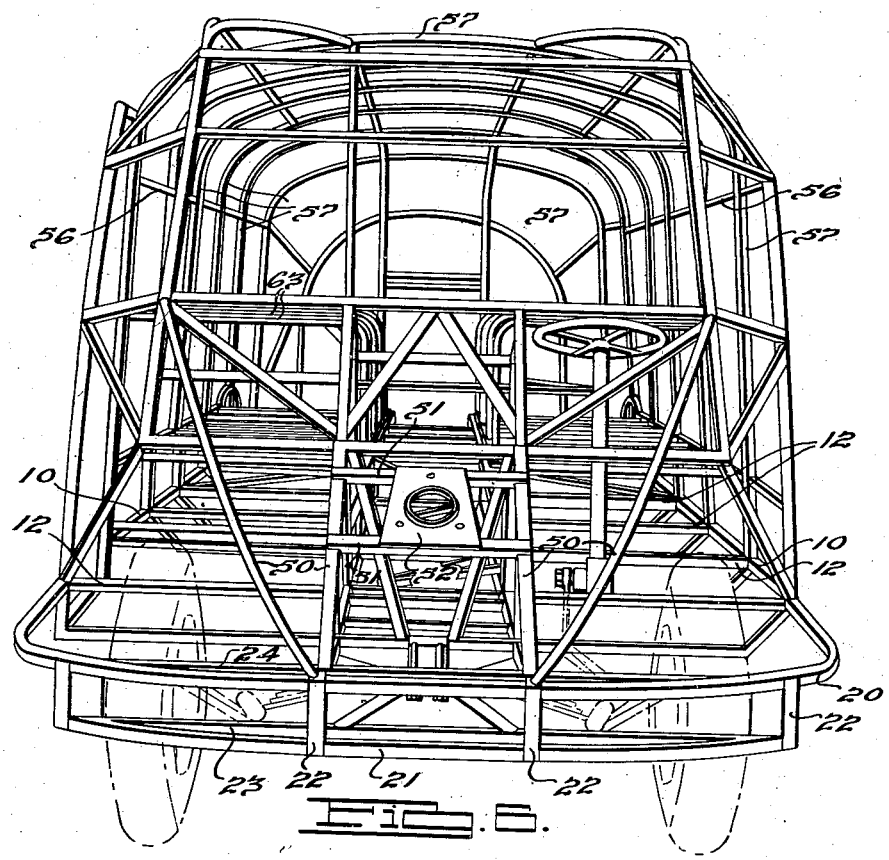
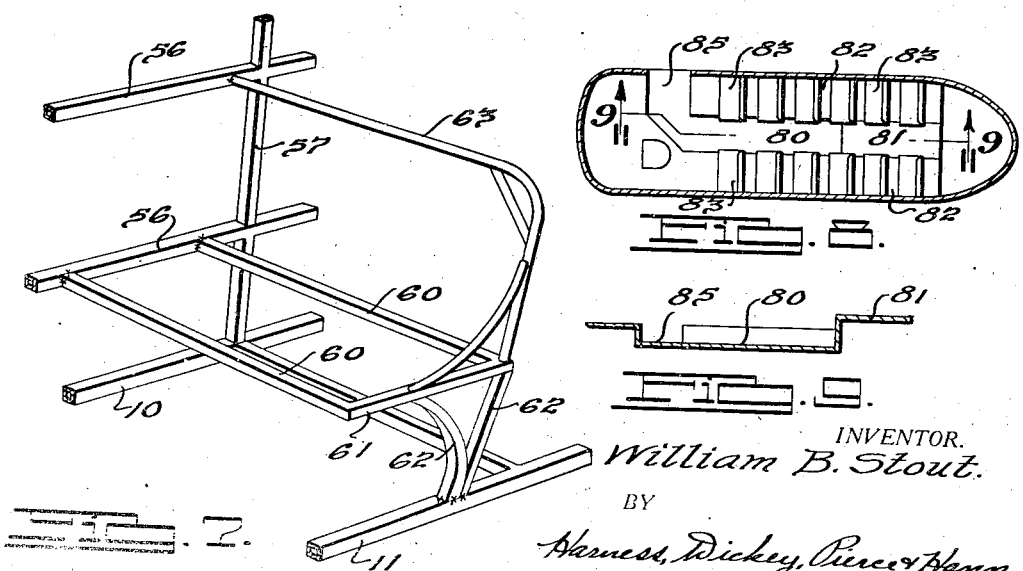
INVENTOR.
William B. Stout.
BY
Harness, Dickey, Pierce & Mann
ATTORNEYS.

June 7, 1938.   W. B. STOUT   2,119,655
BUS BODY CONSTRUCTION
Filed Aug. 19, 1936   4 Sheets-Sheet 4
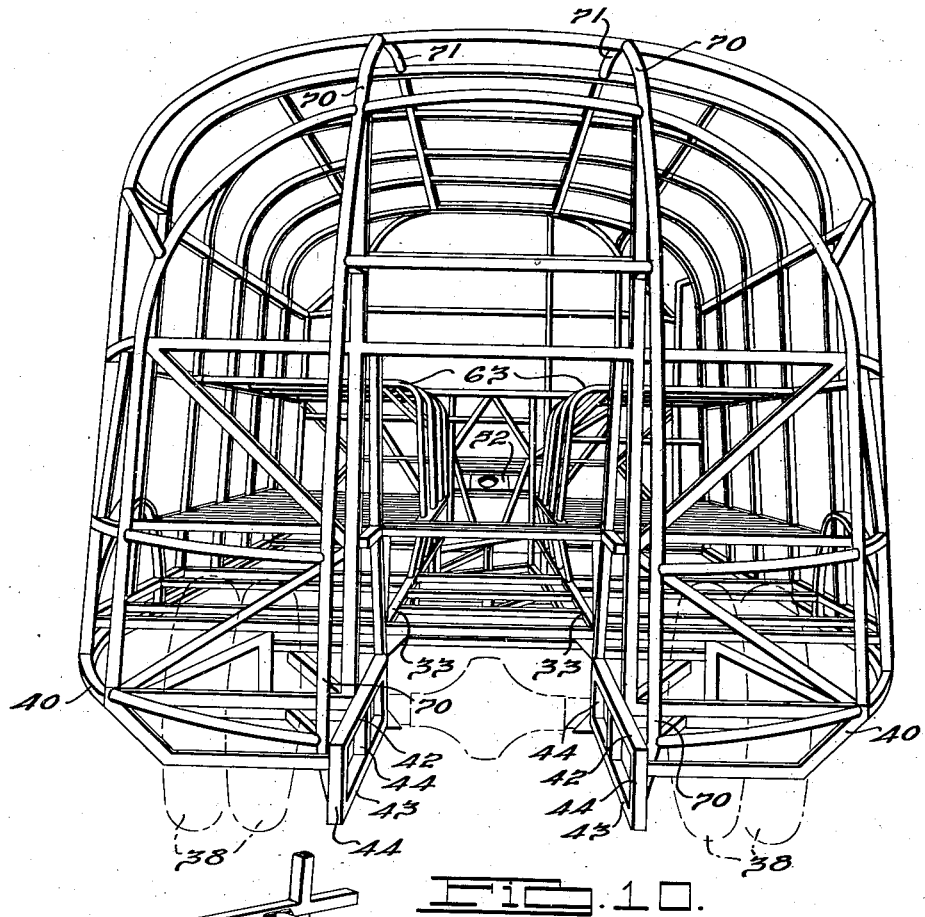
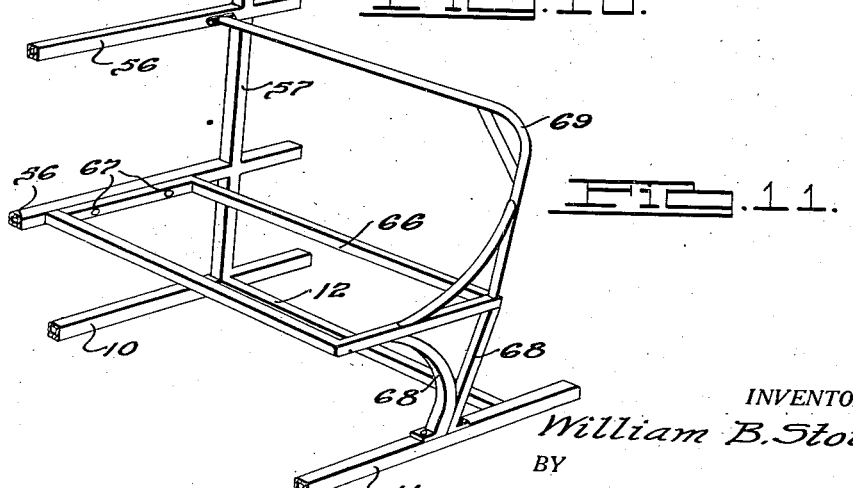
INVENTOR.
William B. Stout.
BY
Barnes, Dickey, Pierce & Hann
ATTORNEYS.

Patented June 7, 1938

2,119,655

UNITED STATES PATENT OFFICE 2,119,655

BUS BODY CONSTRUCTION

William B. Stout, Detroit, Mich., assignor to Gar Wood Industries, Inc., a corporation of Michigan Application August 19, 1936, Serial No. 96,851

2 Claims. (Cl. 296—28)

This invention relates to automotive vehicle body constructions. More particularly it relates to a novel and improved form of vehicle body construction primarily adapted for use as a bus for carrying a relatively large number of passengers.

It is a primary object of the present invention to provide a bus body construction which is relatively cheap in construction, easily fabricated, and which is extremely light in weight in comparison to the strength characteristics of the body as a whole.

The present invention contemplates the provision of a bus body comprising a tubular steel framework to which sheet metal sheathing panels are secured and which together with the framework provides an extremely strong and rugged construction which is extremely light in weight and affords a maximum of available space interiorly of the body.

Further, the present invention contemplates the provision of a bus body in which the framework of the body as a whole, after fabrication, constitutes a unitary substantially integral structure including both the body framework and the chassis of the vehicle as a single unit.

It is an object of the present invention to provide a bus body in which a maximum seating capacity is obtained and in which a relatively low vertical height of the body construction as a whole is provided, yet at the same time providing ample headroom throughout portions of the interior.

The present invention contemplates the provision of a framework comprising a pair of trusslike, longitudinally extending, relatively spaced side frames which serve to support the passenger carrying seat frames within the vehicle. Thes trusslike frameworks are interconnected by transversely extending brace members which connect the frameworks at points substantially lower than the upper surfaces thereof, thus providing an aisle down the middle of the bus which is disposed on a level considerably lower than the floor level of the framework on which the seat frames are mounted. This construction is particularly adaptable for use in vehicles of the type disclosed in the present application inasmuch as it makes headroom available in the aisle of the bus where such headroom is particularly needed.

Still further the present invention contemplates the provision of a bus construction in which the body thereof includes a pair of longitudinally extending trusslike framework members, which framework members are so constructed and arranged as to inherently provide recesses for the mounting of the wheels of the vehicle and which are sufficiently widely spaced apart to provide a well or recess at the rear end of the vehicle for mounting a driving unit.

Still further the present invention contemplates the provision of a bus body construction in which the steel frames are a permanent integral part of a unitary body and chassis structure, thus making possible greater strength and rigidity of the structure as a whole.

Yet another object of the present invention consists in the provision of a bus body construction comprising a plurality of sheet metal members secured directly to a tubular steel framework. The framework is of such construction that the sheet metal panels providing the surface covering of the vehicle as a whole, not only serve to strengthen and reinforce the framework construction, but are of such configuration that they may be easily fabricated and conveniently secured thereto.

Many other and further objects, advantages and features of the present invention will become clearly apparent from the following specification when considered in connection with the accompanying drawings forming a part thereof.

In the drawings:

Fig. 1 is a perspective view of a completely assembled bus embodying the improvements of the present invention;

Fig. 2 is an enlarged perspective view of the bus shown in Fig. 1 with the sheathing and other portions thereof removed to illustrate in detail the framework construction composing the unitary body and chassis frame;

Fig. 3 is a side elevational view, with portions exploded to show a manner in which unitary assemblies may be secured together to make the body and chassis framework of the bus body;

Fig. 4 is a transverse sectional view, taken substantially on the line 4—4 of Fig. 2, illustrating in detail the cross-sectional configuration of the framework and the manner in which the members are secured together to provide a reinforced construction;

Fig. 5 is an enlarged fragmentary sectional view, taken substantially on the line 5—5 of Fig. 4, illustrating in detail the manner in which a spring mounting bracket may be secured to the framework;

Fig. 6 is a front elevational view of the bus body with the sheathing removed, illustrating in detail the construction and arrangement of tubu- Fig. 7 is a fragmentary interior perspective view of the framework for one of the seats, illustrating in detail the manner in which this seat framework is secured to the floor and sides of the bus in order to reinforce the construction thereof;

Fig. 8 is a diagrammatic interior floor plan of the improved bus body illustrating in detail the aisle construction and arrangement of seats interiorly of the body;

Fig. 9 is a diagrammatic sectional view, taken substantially on the line 9—9 of Fig. 8, illustrating in detail the relative levels of the interior floor structure of the bus body;

Fig. 10 is a rear elevational view of the bus body and chassis framework, illustrating in detail the construction of the tubular frame members which serve to define the well for mounting the motor; and Fig. 11 is a fragmentary perspective view similar to Fig. 7, illustrating in detail a modified form of seat construction and the modified manner in which the same is mounted interiorly of the bus body construction.

With more particular reference to the drawings, it will be seen that the framework structure for the bus body comprises a plurality of hollow steel tubular members welded together to provide a substantially integral body and chassis framework. The specific detailed manner in which these tubular members are disposed and secured together is shown as merely illustrative of one particularly satisfactory type of frame construction, and it will be clearly apparent to those skilled in the art that substantial modification and departures therefrom may be made, at the same time retaining the generic inventive spirit of the present invention as hereinafter pointed out in greater detail.

The framework making up the body construction includes a pair of longitudinally extending tubular members 10 which extend throughout the length of the seating portion of the bus and serve to define the outer and lower marginal edges of the body construction. Spaced inwardly from these outer longitudinal tubular members are a pair of longitudinally extending tubular frame members 11 which are adapted, as will hereinafter be seen, to define each of the lateral edges of a sunken aisle portion of the bus. The longitudinal members 10 and 11 on the respective sides of the bus framework are interconnected by means of transversely extending brace members 12 which serve to maintain the longitudinal members in substantially uniformly spaced relation throughout their length. Spaced a substantial distance below each of the longitudinally extending tubular frame members 11 is a longitudinally extending frame member 13 which runs substantially the entire longitudinal length of the bus as completely assembled and is joined to its respective frame member 11 by means of suitable vertically extending tubular members 14. While it will of course be appreciated that the manner in which the various tubular members making up the framework are joined is not material to the present invention, it has been found particularly desirable to weld these members together in order that a permanent and strong joint will be obtained therebetween and result in the formation of a substantially integral and extremely rugged final assembly.

Each of the longitudinally extending frame members 10 is joined to its respective longitudinally extending frame member 13 by means of a plurality of transversely extending brace members 15 which are preferably bent at obtuse angles in order to provide a rounded configuration at the lower peripheral edge of the body construction and to provide the necessary offset resulting from the difference in level on which the members 10 and 13 are disposed. The forward ends of the longitudinally extending members 10 are interconnected by a substantially U-shaped tubular member 20 which extends around and defines the front marginal edge portion of the body. A suitable arcuately extending tubular member 21 may be secured to the forward portion of the brace member 20 and spaced downwardly therefrom by means of suitable vertically extending support members 22. This front end construction may be reinforced additionally by means of transversely extending members 23 and 24 joined to the arcuate members 20 and 22, respectively, to provide a reinforced bumper construction at the front end of the body forwardly of the wheel housing structures hereinafter described. This front end construction not only serves to provide a reinforced body construction forwardly of the wheels, but also serves to provide substantially rigid means for interconnecting the longitudinally extending truss frame formed by the members 10, 11 and 13, together with their respective cross braces. These longitudinally extending truss frames formed by the longitudinally extending members 10, 11 and 13, together with their interconnecting braces, are connected at suitable spaced intervals throughout their length by horizontal transversely extending tubular brace members 25 which are permanently secured to the longitudinally extending members 13.

It will be seen that suitable flooring, not shown, may be utilized for covering the truss frames and that this flooring will extend between the outside longitudinal member 10 and the inside longitudinal member 11 and will be suitably supported at intermediate points by means of the transversely extending braces 12. Further flooring, not shown, may be supported on the transversely extending brace members 25 and it will be seen that the flooring in the longitudinal central portion of the bus body will be disposed at a substantially lower level than the flooring on either side of this aisle. The bracing structure may be conveniently modified adjacent the forward end of one of the truss frames in order that flooring may be disposed upon substantially the level of the aisle flooring to provide an entry way for the bus at the forward end thereof on one side only. Such structure may be easily and conveniently provided without material sacrifice in strength.

It is particularly desirable that the body as a whole be constructed in such a manner that its overall height will be reduced to the maximum possible yet at the same time retaining adequate road clearance. Consequently, it is necessary to provide a somewhat modified structure in order to accommodate the rear wheels of the vehicle. In order to provide housings for these wheels, an additional longitudinally extending member 30 is disposed above the member 10 in spaced relation thereto adjacent the region of the rear wheel housings of the bus body. This longitudinally extending member is spaced with respect to the longitudinally extending member 10 by means of suitable vertical tubular members 31 and is transversely connected by means of suitable cross braces 32 with a corresponding longitudinally extending member 33 disposed directly above the longitudinally extending members 11. The members 33 may be permanently secured to the adjacent members 11 by means of vertically extending braces 34. The longitudinally extending members 33 are preferably transversely interconnected across the aisle by means of suitable horizontally extending braces 36 which serve to provide, together with the transversely extending members 32, support for flooring on a level substantially above the level of the aisle supported by the braces 25 and slightly above the level of the flooring supported by the longitudinally extending truss frame.

It will be appreciated by reference to the drawings that this structure provides for a floor level interiorly of the bus sufficiently high to provide clearance for pairs of rear wheels 38 which are to be mounted in these wheel housings. The longitudinally extending tubular members 11 may be continued substantially rearwardly by means of tubular members 42 which have connected therewith and spaced therebelow rearwardly extending tubular members 43 which are interconnected therewith by means of vertically extending spaced members 44. It will be apparent by reference to Fig. 10 that the tubular members 40 are bent around to be joined to the rearwardly extending truss frames formed by the members 42, 43 and 44, and that these truss frames are spaced substantially from each other to provide a well or recess at the rear portion of the bus and to provide a framework for mounting a motor power unit therein.

The particular type of bus body illustrated in the present application is primarily designed for use in connection with a rear mounted motive power unit. It will be understood that the specific embodiment of the invention illustrated in the drawings is primarily intended for use with a motive power unit which is not only located in the rear of the bus body as a whole but is located at a point substantially rearwardly of the rear axle of the body and consequently the drive from the motor is forward from the motor to the differential disposed between the rear wheels. The provision of this rear well in the bus body construction provides a convenient means for removably mounting the motive power unit therein. Further, it will be appreciated that the bus body as a whole comprises a pair of longitudinally extending truss frameworks, which are each provided with housings adapted to receive the front wheels and additional housings adapted to receive the rear wheels. The space between these longitudinally extending trusslike frameworks forms, in the passenger compartment of the vehicle, a sunken aisle between the frameworks in order to provide additional headroom in the central portion of the bus body. The space between these longitudinally extending trusslike frameworks, at the rear portion of the vehicle, serves to provide a well or recess for mounting of the motive power unit.

The forward portion of the bus body includes a plurality of rearwardly sloped tubular members 50 which are joined at their lower forward ends to the inner and upper sides of the trusslike frameworks and serve to define the cowl or front portion of the bus. The rearwardly sloped frame members 50 may be interconnected by means of suitable brace members 51, which serve to support a plate 52 providing means for conveniently mounting a spare wheel in the front portion of the bus body. Suitable frame members 55 may be joined together to provide a front end construction having the desired exterior configuration and to define windshield openings 56 at the forward end of the bus body as a whole.

The roof and side walls of the bus body include a plurality of longitudinally extending tubular frame members 56 which are joined together by means of rounded transversely extending brace members 57 at suitable intervals throughout the length of the vehicle. The lowermost of the longitudinally extending frame members 56 is disposed at a height sufficiently far above the longitudinally extending frame member 10 in order that it will lie substantially on the level desired for the base frame of vehicle seats to be mounted interiorly of the vehicle body.

The seats to be mounted interiorly of the body preferably comprise a generally rectangular base frame formed of suitable tubular members 60, which are connected at their ends to this lowermost longitudinally extending frame member 56. These members 60 are interconnected at their inner ends by means of a longitudinally extending brace 61, which brace 61 is supported upon and directly above the longitudinally extending frame member 11 by means of suitable legs 62. A seat back frame is supported at its inner end upon the members 60 and 61 and at its outer end to the next uppermost longitudinally extending frame member 56 above the lowermost member 56 described below.

From the foregoing, it will be readily appreciated that the seat frame members provide a rigid interconnection between the lowermost pair of longitudinally extending frame members 56 and the truss frames, which, as has been explained above, extend longitudinally of the vehicle on either of the lateral sides thereof.

In the modified form of the invention illustrated in Fig. 11 of the drawings, it will be appreciated that the seat structure shown therein may be removably mounted in the bus body if desired. In this form of the invention, a substantially rectangular seat base frame 66 is provided which is removably secured by means of a pair of bolts 67 to the lowermost longitudinally extending side frame member 56. The inner end of this rectangular frame member 66 may be supported by means of a pair of legs 68, which may conveniently be bolted at their lower ends to the longitudinally extending frame member 11 of the truss framework. The seat back frames 69 may be substantially identical in construction with that described in connection with the seat construction shown in Fig. 7 except that, instead of being permanently secured at its outer end to the longitudinally extending frame member 56, it may be conveniently bolted thereto, as shown.

The body construction at the rear portion of the bus is clearly seen in Fig. 10 and includes a plurality of upwardly and forwardly extending brace members 70 which may conveniently be joined at their forward ends to the rearwardly extending frame members 56 by means of suitable tubular connecting brace members 71. Additional bracing frame members 75 may interconnect these members to provide a reinforced structure having the desired exterior configuration for the rear portion of the bus and at the same time defining generally a well or recess at the rear thereof between the longitudinally extending truss frames to provide a convenient place for mounting the motor, as has been described above.

The rear bracing frame of the body may be conveniently connected to the rearwardly extending, longitudinal member 56 by suitable tubular braces 76.

By reference to Figs. 8 and 9 of the drawings, it will be seen that the bus body thus formed is generally streamline in shape and includes a sunken aisle 80 extending down the central portion of the interior thereof. The rear portion of the aisle 80 is raised to provide a floor level 81, which is not only substantially above the floor level of the main portion of the aisle 80, but is also above the floor level of the portions of the interior of the bus 82 disposed upon each of the lateral sides of the aisle. This provides a rear wheel housing construction which provides ample room for relative movement of the rear wheels, axle and differential with respect to the body of the vehicle. It will be seen that a plurality of seats 83 may be conveniently mounted on either side of the aisle and that one of the truss frames is fabricated to provide an entryway 85 communicating with the aisle portion 80 in order to permit access to the interior of the bus on the floor level of the aisle 80. It will further be readily appreciated that the sunken central aisle construction shown provides convenient means for access to the interior portion of the bus and that the roof thereof may be sufficiently low so that ample headroom is available for a passenger who is standing in the aisle and at the same time ample headroom is available for passengers seated in the seats 83, while ample headroom is not necessarily available for passengers who should perhaps be standing upon the floor portions on either side of the aisle construction.

As illustrated in Fig. 5, the transversely extending base members 12 and 15 serve to provide convenient means for supporting a bracket 90 which may conveniently support a shackle 91 for supporting one end of a spring 92 for mounting the rear wheels of the vehicle. This illustration amply shows the particularly easy manner in which the framework construction disclosed in this application lends itself to the mounting of the various essential portions of the vehicle with respect thereto.

After completion, the framework has been welded to provide a substantially integral, relatively rigid construction. All joints of mating portions of the framework have been welded together, thus providing a rigid reinforced frame. Suitable sheathing 93 of sheet metal may be utilized for the purpose of covering the exterior surface of the framework thus provided. This sheathing may be welded or bolted directly to the tubular members making up the framework and serves together therewith to materially strengthen the frame as a whole.

The bus body in its completed form may include a plurality of windows 95 around the sides thereof and windshield openings 96 at the forward ends. The sheathing may be interrupted toward ends. The hingedly mounted trap door 97 in order to provide access to the spare tire mounting in the front portion of the vehicle. If desired, a door 98 may be mounted in the rear portion of the vehicle in order to provide access to the interior of the bus at this point.

It will be appreciated from the foregoing that while only one specific embodiment and construction of the bus has been illustrated and described, many other and further modifications thereof falling within the scope of the invention as defined in the subjoined claims will be clearly apparent to those skilled in the art.

I claim as my invention:

1. A bus body frame construction comprising a pair of longitudinally extending truss-like frameworks, each of said frameworks including at least three longitudinally extending members disposed in substantially parallel relation, vertically extending members interconnecting a pair of said longitudinal members, upper sets of more than two transversely extending members serving to interconnect said longitudinally extending members, corresponding lower sets of transversely extending members serving further to interconnect said longitudinally extending members, all of said members in each framework being welded together to provide a rigid unitary structure, said frameworks being disposed in substantially spaced parallel relation, brace members interconnecting said frameworks and disposed in the same general plane as said lower set of transversely extending members to provide an aisle supporting structure located between said frameworks, and additional longitudinally extending members secured to said frameworks at the rear thereof whereby to provide means for mounting a motor therebetween.

2. A bus body frame construction comprising a pair of longitudinally extending truss-like frameworks, each of said frameworks including at least three longitudinally extending members disposed in substantially parallel relation, vertically extending members interconnecting a pair of said longitudinal members, upper sets of more than two transversely extending members serving to interconnect said longitudinally extending members, corresponding lower sets of transversely extending members serving further to interconnect said longitudinally extending members, all of said members in each framework being welded together to provide a rigid unitary structure, said frameworks being disposed in substantially spaced parallel relation, brace members interconnecting said frameworks and disposed in the same general plane as said lower set of transversely extending members to provide an aisle supporting structure located between said frameworks, wall frames anchored to and extending upwardly from the outboard side of said frameworks, and seat frames anchored to both said wall frames and said frameworks whereby to reinforce the joints therebetween.

WILLIAM B. STOUT